(12) United States Patent
Hawryluk et al.

(10) Patent No.: US 6,617,600 B1
(45) Date of Patent: Sep. 9, 2003

(54) RADIATION SHIELD DEVICE AND METHOD

(75) Inventors: Andrew M. Hawryluk, Los Altos Hills, CA (US); Joe Gortych, Winooski, VT (US); Yu Chue Fong, Fremont, CA (US)

(73) Assignee: Ultratech Stepper, Inc., San Jose, CA (US)

( * ) Notice: Subject to any disclaimer, the term of this patent is extended or adjusted under 35 U.S.C. 154(b) by 0 days.

(21) Appl. No.: 09/505,595

(22) Filed: Feb. 16, 2000

(51) Int. Cl.[7] .............................. G21F 1/00; G21F 3/00
(52) U.S. Cl. ............................... 250/505.1; 250/515.1
(58) Field of Search ............................ 250/505.1, 515.1

(56) References Cited

U.S. PATENT DOCUMENTS

| | | | | |
|---|---|---|---|---|
| 3,620,597 A | * | 11/1971 | Schwartz et al. | 359/243 |
| 4,114,985 A | | 9/1978 | Friedman | 350/266 |
| 4,472,055 A | * | 9/1984 | Tsutsumi | 356/624 |
| 4,575,610 A | | 3/1986 | Gavin | 219/121 |
| 4,642,445 A | * | 2/1987 | Stol | 219/121.84 |
| 4,650,287 A | * | 3/1987 | Kudo et al. | 250/515.1 |
| 4,753,169 A | * | 6/1988 | Shores | 102/293 |
| 4,855,605 A | * | 8/1989 | Schroeter | 250/505.1 |
| 5,027,061 A | * | 6/1991 | Palmer et al. | 324/156 |
| 5,153,425 A | | 10/1992 | Meinzer et al. | 250/216 |
| 5,993,439 A | * | 11/1999 | Costello et al. | 606/9 |

* cited by examiner

Primary Examiner—Bruce Anderson
(74) Attorney, Agent, or Firm—Allston L. Jones

(57) ABSTRACT

A radiation shield device (100) and method, the apparatus comprising either an absorbing shield (130), a scattering shield (200) or an absorbing and scattering shield (300) arranged in a processing tool (50) that irradiates a workpiece (70) with high-irradiance radiation (80) from a light source (78). The processing tool has a tool portion (66) having an irradiance damage threshold ($I_{DT}$). The radiation shield device is designed to intercept a portion of the high-irradiance radiation that would otherwise be incident the tool portion, and to ensure that radiation exiting the particular shield comprising the radiation shield device and incident the tool portion has an irradiance below the tool portion irradiance damage threshold. The method includes using the radiation shield device in processing a workpiece using a processing tool.

43 Claims, 3 Drawing Sheets

RADIATION SHIELD DEVICE AND METHOD

FIELD OF THE INVENTION

The present invention relates to radiation shields, and in particular to such shields for protecting a tool from being damaged by high-irradiance radiation when processing a workpiece with the tool.

BACKGROUND OF THE INVENTION

In many modern-day manufacturing applications, such as semiconductor manufacturing or materials processing, it is desirable to process an object ("workpiece"), with a beam of high-irradiance radiation to modify the chemical, physical or electrical properties of the workpiece. In semiconductor manufacturing, the substrate is often a silicon wafer, and in materials processing, the substrate can be a metal plate. For most applications, the radiation source is a high-irradiance (units: $J/cm^2$) laser. Efficient manufacturing techniques typically require that a robotically controlled tool deliver this high-irradiance radiation to the workpiece, preferably with little user intervention.

With reference to FIG. 1, prior art processing tool 10 comprises, in order along axis A1, a workpiece support member 14 (i.e., a "chuck") and a tool portion 20. The latter includes a variety of components such as vacuum lines, electrical cables, mechanical apparatus, metal surfaces, and the like. Workpiece support member 14 supports a workpiece 24 having an upper surface 26, a lower surface 28 and an outer edge 30. A source of radiation (not shown) irradiates upper surface 26 of workpiece 24 with high-irradiance radiation 34.

A problem often encountered in radiation-based processing tools such as processing tool 10 is that a portion 38 of high-irradiance radiation 34 incident workpiece 24 spills over onto tool portion 20, or even onto workpiece support member 14. Portion 38 is referred to herein as "spillover radiation." This happens most often when a region on surface 26 near the edge of workpiece 24 is being processed. Since spillover radiation 38 has sufficiently high irradiance to modify the surface properties of workpiece 24, it also typically has sufficient irradiance to modify the surface properties of tool portion 20. In time, spillover radiation 38 can damage tool portion 20, can cause unwanted heating problems within processing tool 10, and can result in potentially harmful reflections.

Unfortunately, it is not possible to simply shield the tool from spillover radiation using conventional shields made of metal or plastic, because the high irradiance beam would damage such a shield. For instance, simply extending workpiece support member 14 to capture spillover radiation is not a practical solution because the workpiece support member typically needs to be made of a light, machinable metal such as aluminum, which is susceptible to damage from high-irradiance radiation.

Ideally, it is desirable to intercept spillover radiation 38 with a shield capable of rendering the radiation harmless before it irradiates the tool. If, for example, a metallic shield is placed between workpiece 24 and tool portion 20 to intercept spillover radiation 38, the metallic shield will, in all likelihood, ablate or be damaged by the radiation. Further, a metallic shield may reflect radiation onto other portions of processing tool 10. Generally, speaking, any shielding material that relies primarily upon surface absorption of radiation will probably be damaged.

There are several prior art shields designed to intercept radiation and render it harmless. For example, U.S. Pat. No. 5,153,425, entitled "Broadband Optical Limiter with Sacrificial Mirror to Prevent Irradiation of a Sensor System by High Intensity Laser Radiation," describes a broadband optical limiter for use in combination with a sensor system operative to prevent irradiation of the sensor system by laser radiation of unknown wavelengths having intensity levels sufficient to damage or disable the sensor system. The broadband optical limiter is further operative to throughput, with minimal optical distortion at wide-angle fields of view, electromagnetic radiation in the operating spectral band(s) of the sensor system. The broadband optical limiter includes a flat or spherically shaped sacrificial mirror that is operative to reflect electromagnetic radiation in the operating spectral band(s) of the sensor system and to be optically machined, i.e., vaporized, by focused laser radiation of unknown wavelengths having intensity levels sufficient to damage or disable the sensor system to create reflective dead spot. The reflective dead spot prevents the focused laser radiation from being throughputted to the sensor system. The broadband optical limiter further includes optical components to focus incident electromagnetic and laser radiation onto the sacrificial mirror, to turn incident electromagnetic and laser radiation out of the field of view of the sensor system, and to turn electromagnetic radiation reflected by the sacrificial mirror back into the field of view of the sensor system. A major disadvantage of this type of shield, however, is that it is sacrificial, and changes due to the irradiation. Such shields tend to need to be replaced frequently.

U.S. Pat. No. 4,114,985, entitled "Shield for High Power Infrared Laser Beam," describes shielding from and the termination of high power infrared laser beams by interception of the beam by one of two spaced, juxtaposed, ceramic (i.e., clay-based) sheet members. The beam-intercepting member has a thickness to beam power density relationship that allows opaque to translucent conversion of the portion thereof illuminated by the beam. The translucent portion subsequently diffuses the beam. The second ceramic sheet member then absorbs the diffused beam. A major shortcoming of this shield, however, is that it requires two clay-based, opaque sheet members, with the first sheet having to be of sufficient strength to cause a transformation from opaque to translucent by virtue of the incident radiation.

U.S. Pat. No. 4,575,610, entitled "Laser Shielding Device," describes a laser-shielding device having two spaced-apart layers of shielding material defining a sealed chamber between the two layers. At least one layer degrades in the presence of an impinging laser beam, creating a hole through the layer. A pressure change in the chamber is sensed and signaled to a machine controller to stop the lasing operation. Unfortunately, this shield device is not well-suited for protecting a tool from spillover radiation, since the shield is sacrificial and thus would need to be replaced often. Further, the shield is pressurized, which adds to its complexity.

SUMMARY OF THE INVENTION

The present invention relates to radiation shields, and in particular such shields for protecting a tool from being damaged by high-irradiance radiation when processing a workpiece with the tool using high-irradiance radiation.

A first aspect of the invention is a shield for protecting a tool portion having an irradiance damage threshold from high-irradiance radiation from a light source when irradiating a workpiece, said shield arranged between the light source and the tool portion and having an irradiance damage threshold, an absorption coefficient, a volume and a thickness, and designed to absorb in said volume, a portion of said high-irradiance radiation that would otherwise be incident the tool portion, wherein the shield maintains said absorbed high-irradiance radiation below said shield irradiance damage threshold, and wherein radiation exiting the shield and incident the tool portion and incident the tool portion has an irradiance below the irradiance damage threshold of the tool portion.

A second aspect of the invention is a shield for protecting a tool portion having an irradiance damage threshold from high-irradiance radiation from a light source when irradiating a workpiece, said shield arranged between the light source and the tool portion and having an irradiance damage threshold, a scattering coefficient, a volume and a thickness, and designed to scatter in said volume a portion of said high-irradiance radiation that would otherwise be incident said tool portion, wherein said shield maintains said scattered high-irradiance radiation below said shield irradiance damage threshold, and wherein radiation exiting the shield and incident the tool portion has an irradiance below the irradiance damage threshold of the tool portion.

A third aspect of the invention is a shield for protecting a tool portion having an irradiance damage threshold from high-irradiance radiation from a light source when irradiating a workpiece, said shield arranged between the light source and the tool portion and having an irradiance damage threshold, an absorption coefficient, a volume, a scattering coefficient and a thickness, wherein said shield is designed to absorb and scatter in said volume a portion of the high-irradiance irradiation, wherein the shield maintains said absorbed high-irradiance radiation below said shield irradiance damage threshold, and wherein radiation exiting the shield and incident the tool portion has an irradiance below the irradiance damage threshold of the tool portion.

A fourth aspect of the invention is an apparatus that prevents a tool portion having an irradiance damage threshold from being irradiated by high-irradiance radiation from a light source while irradiating a workpiece. The apparatus comprises a workpiece support member for supporting a workpiece, with one of the shields described immediately above, arranged between the light source and the tool portion.

A fifth aspect of the invention is a method of processing a workpiece with high irradiance radiation from a light source using a workpiece processing tool having a tool portion with an irradiance damage threshold. The method comprises the steps of first, supporting the workpiece on a workpiece support member, then arranging one of the shields described immediately above between the light source and workpiece so as to intercept any of the high-irradiance radiation that would otherwise be incident the tool portion, and then irradiating the workpiece.

DETAILED DESCRIPTION OF THE INVENTION

The present invention is an apparatus for, and method of, preventing high-irradiance radiation damage to a tool during processing of a workpiece, which includes positioning a radiation shield device capable of absorbing and/or scattering high irradiance radiation between the workpiece and a tool portion. Here, "high irradiance" means irradiance that exceeds the irradiance damage threshold of the tool portion, as described below.

Figure 1:
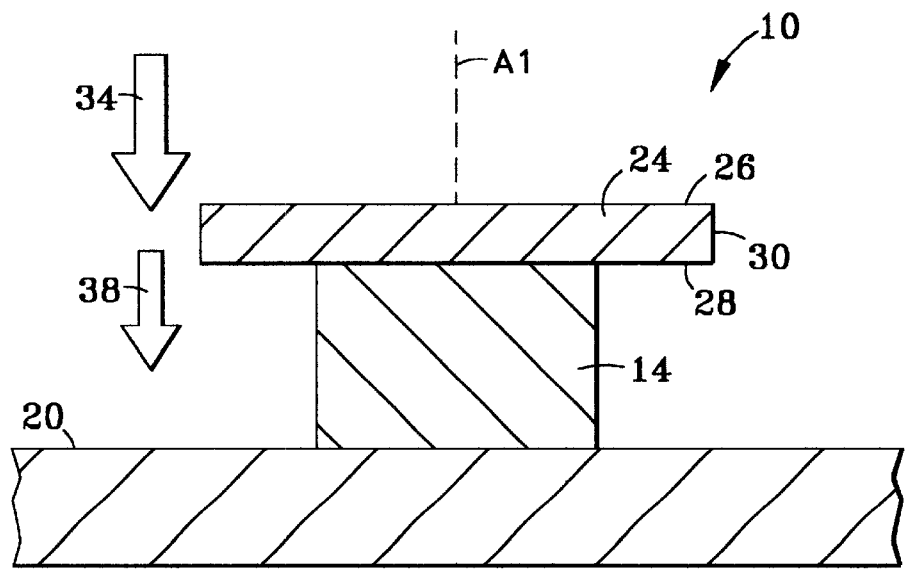
FIG. 1 is a cross-sectional schematic diagram of a prior art tool for processing a workpiece with radiation, illustrating how spillover radiation irradiates a tool portion.
Figure 2:
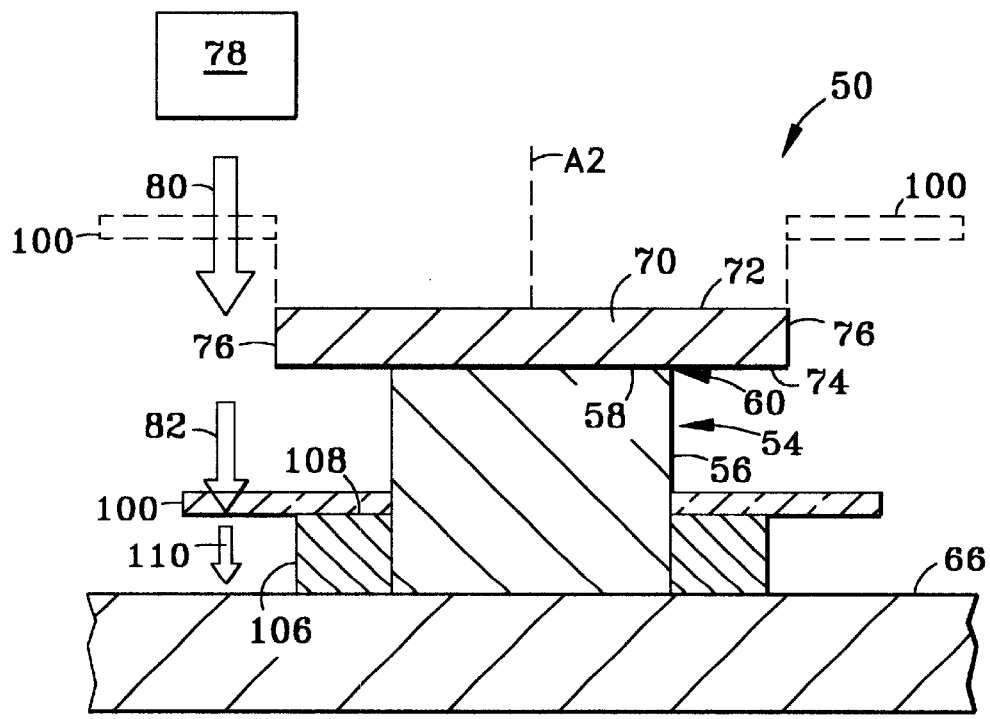
FIG. 2 is a cross-sectional schematic diagram of a tool for processing a workpiece with radiation, the tool including the radiation shield device of the present invention, and illustrating two preferred positions in the range of positions of the radiation shield device between the light source and the tool portion.

With reference to FIG. 2, processing tool 50 comprises, in order along axis A2, a workpiece support member (i.e., a chuck) 54 comprising a body 56 having an upper surface 58 with an outer edge 60. Processing tool 50 further includes a tool portion 66, which may include a variety of components making up tool 50, such as vacuum lines, electrical cables, mechanical apparatus, metal surfaces, and the like (not shown). Workpiece support member 54 supports or holds on upper surface 58 a workpiece 70 having an upper surface 72, a lower surface 74, and an outer edge 76. Processing tool 50 also includes a light source 78 for providing high-irradiance radiation 80 to upper surface 72 of workpiece 70.

As discussed above, a problem often encountered in radiation-based processing tools such as processing tool 50 is that a portion 82 of high-irradiance radiation 80 that is preferably incident workpiece 70 instead "spills over" workpiece edge 76 and irradiates tool portion 66, or possibly workpiece support member 54. This typically occurs when a field or area (not shown) on upper surface 72 near outer edge 76 of workpiece 70 is being processed. Since high-irradiance radiation 80 has sufficiently high irradiance to modify the surface properties of workpiece 70, spillover high-irradiance radiation portion 82 (hereinafter, "radiation 82") also has sufficient irradiance to modify the surface properties of tool portion 66. In time, spillover high-irradiance radiation 82 can damage tool portion 66, can cause unwanted heating problems within processing tool 50, and can cause potentially harmful reflections.

Accordingly, with continuing reference to FIG. 2, processing tool 50 further includes a radiation shield device 100 of the present invention arranged (positioned) between light source 78 and tool portion 66 so as to intercept a portion of high-irradiance radiation 80.

In one preferred embodiment, radiation shield device 100 is arranged between light source 78 and workpiece 70, so that the high-irradiance radiation in high-irradiance radiation 80 that would otherwise form high-irradiance spill over radiation 82 is attenuated below the irradiation damage threshold of tool portion 66 prior to spilling over workpiece edge 76 (see dashed-line radiation shield device 100 in FIG. 2)

In another preferred embodiment, radiation shield device 100 is arranged adjacent to workpiece support member 56 between lower surface 74 of workpiece 70, and tool portion 66, so radiation 82 is attenuated below the irradiance damage threshold of tool portion 66 prior to being incident the tool portion. In this embodiment, it is preferable that workpiece outer edge 76 extends outwardly from axis A2 beyond outer edge 60 of workpiece support member 54.

In practice, workpiece support member 54 may be modified to have a lip 106 surrounding workpiece support member body 56, as shown, with the lip having an upper surface 108 upon which radiation shield device 100 may be supported. Also in practice, radiation shield device 100 may be round or square with a round central aperture sized to fit over body 56 so as to rest on upper surface 108 of lip 106. By way of example, for a laser thermal processing (LTP) tool capable of processing circular workpieces having a diameter of about 200 mm (e.g., 200 mm silicon wafers), an exemplary workpiece support member 54 has a body 56 that is cylindrical with a diameter of about 175 mm, with lip 106 extending outwardly therefrom by about 20 mm (i.e., about 195 mm across), and a radiation shield device 100 that is square with dimensions of about 225×225 mm, the shield including a central aperture sized to fit over cylindrical body 57 so that the shield device can rest on lip upper surface 108.

To render radiation 82 harmless, radiation shield device 100 of the present invention needs to be made of a material that either absorbs high-irradiance radiation within a large volume (rather than on the surface), or scatters high-irradiance radiation into a sufficiently wide spatial and angular range, or does both, so that the irradiance of the radiation 110 exiting radiation shield device 100 and incident tool portion 66 is insufficient to damage the tool portion. Described below are several different embodiments of radiation shield device 100 of the present invention.

Absorbing Shield Embodiment

Figure 3:
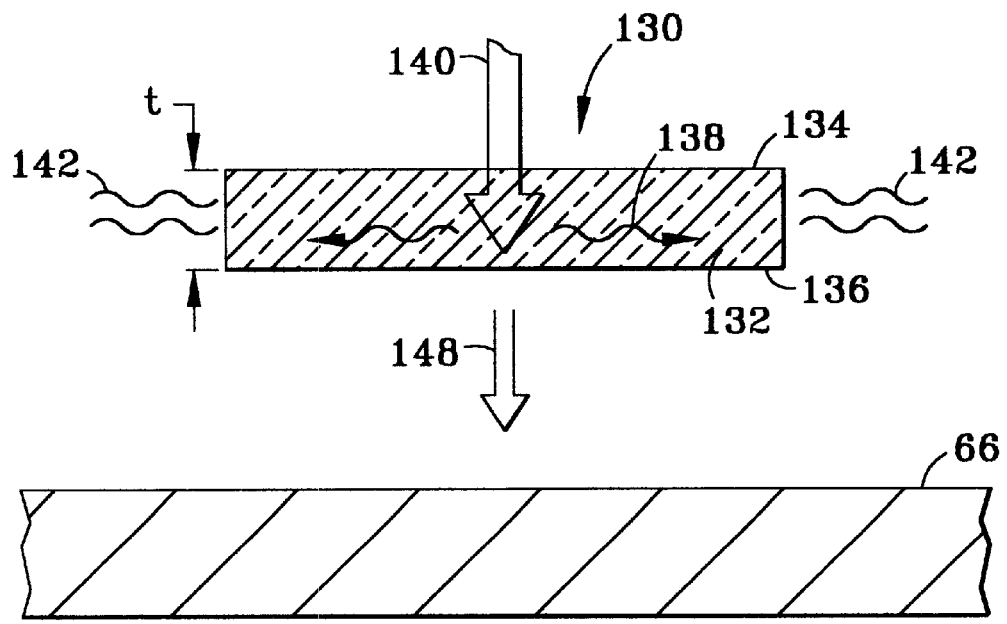
FIG. 3 is a cross-section schematic diagram of a section of the processing tool of FIG. 2, further including a first embodiment of the shield device of the present invention comprising an absorbing shield.

With reference to FIG. 3, in a first embodiment of the present invention, the radiation shield device 100 of FIG. 2 comprises an absorbing shield 130 having a volume 132, an upper surface 134, and a lower surface 136. Shield 130 comprises a material designed to absorb a portion of a high-irradiance beam 140 (which may be a spillover beam such as spillover beam 82, or a direct beam such as high-irradiance radiation 80, depending on the position of absorbing shield 130; see FIG. 2) within volume 132. The goal is to dissipate the absorbed energy in volume 132 of absorbing shield 130 (as indicated by arrows 138) and to radiate this energy out into space as heat (as indicate by wavy lines 142), rather than to absorb the energy from beam 140 at upper surface 134, as with conventional shields. To properly effectuate volume absorption shielding using absorbing shield 130 such that the shield need not be replaced often (if at all), the absorption coefficient of the shield material needs to be such that the absorbed energy density is maintained below the shield's irradiance damage threshold, $I_{DS}$ (Joules/cm$^3$).

The irradiance (energy density) absorbed in shield 130 is given by:

$$I_{ABS}(\text{Joules/cm}^3) = I_R \, a \, (1-\exp(-at)) \, (\text{Joules/cm}^3) < I_{DS}(\text{Joules/cm}^3) \quad (1)$$

where a is the absorption coefficient of the shield in units of (cm$^{-1}$) (also known as the inverse of the absorption length), t is the thickness of the absorption shield, and $I_R$ is the irradiance (Joules/cm$^2$) of radiation 140 incident the shield at upper surface 134.

A number of commercially available partially transmitting glasses have an absorption length greater than 0.1 mm. Exemplary materials for absorber shield 130 is one of a variety of partially transmitting glasses produced and sold by Schott Glass Technologies, Inc. (Duryea, Pa.), such as one of the F5-type glasses (for λ<400 nm applications), and NG series glass (for 400 nm<λ<1200 nm applications). Other glasses include neutral density and color filter glass. For these glasses, a thickness t of a few millimeters will absorb a sufficient amount of radiation at the appropriate wavelengths. Depending upon the irradiance of the incident radiation, these glasses can be designed (either analytically or empirically) to have a thickness that will distribute the absorbed energy into a sufficiently large volume such that they will not be damaged. The irradiance of radiation 140 will decrease as it progresses through volume 132 according to the equation:

$$I_R(\exp(-at)). \quad (2)$$

From equation (2), it can be seen that the volumetric absorption will be greatest near upper surface 134 (i.e., at the surface of incidence, where t=0), before the incident radiation has an opportunity to be absorbed by the plate. The volumetric absorption $I_{ABS}$ at upper surface 134 is approximately:

$$I_{ABS}(\text{Joules/cm}^3) = I_R \, a \, (\text{Joules/cm}^3). \quad (3)$$

Shield 130 also needs to have a sufficient thickness, t, such that residual radiation transmitted through the shield is incapable of damaging tool portion 66. In other words, the irradiance of radiation 148 exiting shield 130 from lower surface 136 needs to be attenuated such that it is below the irradiance damage threshold $I_{DT}$ of tool portion 66.

The irradiance of radiation 146 is given by:

$$I_T(\text{Joules/cm}^2) = I_R(\text{Joules/cm}^2) \, (\exp(-at)) < I_{DT}(\text{Joules/cm}^2) \quad (4)$$

In general, a minimum value for (at) is 1, and more practical values range from 2 to 5.

Note that the units for surface damage thresholds are given in J/cm$^2$, whereas the units for volumetric damage thresholds are in J/cm$^3$.

Scattering Shield Embodiment

Figure 4:
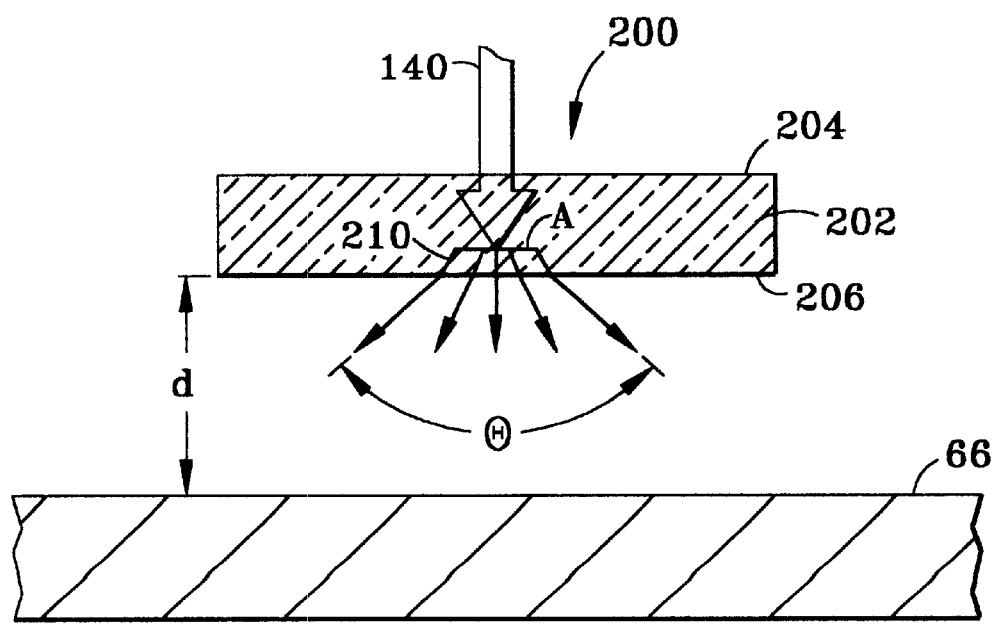
FIG. 4 is a cross-section schematic diagram of a section of the processing tool of FIG. 2, further including a second embodiment of the shield device according to the present invention comprising a scattering shield.

With reference to FIG. 4, in a second embodiment of the present invention, the radiation shield device 100 of FIG. 2 comprises a scattering shield 200 having a volume 202, an upper surface 204, and a lower surface 206. Shield 200 comprises a material designed to scatter a portion of high-irradiance beam 140 (which may be a spillover beam such as spillover beam 82, or a direct beam such as high-irradiance radiation 80, depending on the position of shield 200) within volume 202 over a scattering angle (scattering coefficient), Θ. The scattering coefficient, Θ, is defined such that the energy is scattered into a volume determined by a cone with an angle Θ, as shown. For a purely diffuse scattering shield, Θ=4n, and the intensity drops off as approximately 1/(Θd$^2$) (or 1/(4nd$^2$)). An exemplary material for a scattering shield is opal glass (including single and double flashed opal), available from Corning, Inc (Corning, N.Y.). Other sources of opal glass are DESAG (Germany), S. A. Bendheim (Oakland, Calif.), Hollander Glass (Santon, Calif.) and Edmund Scientific (Barrington, N.J.). In addition, shield 200 can comprise translucent porcelain or a turbid media, such as milk, sea water, or a solution of water mixed with small particles, such as latex or polystyrene spheres, which can be purchased from Interfacial Dynamics (Portland, Oreg.).

Scattered light 210 exits lower surface 206 and is incident tool portion 66 located a distance d, away from scattering shield 200.

To serve its purpose, scattering shield 200 needs to have a scattering coefficient, Θ, sufficiently large so as to keep the irradiance of scattered light 210 incident tool portion 66 tool below the tool portion irradiance damage threshold, $I_{DT}$. The irradiance $I_{ET}$ of radiation 210 exiting lower surface 206 and incident tool portion 66 is approximately given by:

$$I_T(\text{Joules/cm}^2) = I_R \, A/(\Theta d^2) \; (\text{Joules/cm}^2) \quad (5)$$

wherein A is the area illuminated by incident radiation 140.

It should be noted that the above equation is an approximation. Irradiance, $I_T$, can be considered an amount of energy emanating from scattering shield 200 as a "virtual"-light source. If this virtual light source is an isotropic emitter, the emission fills a sphere of radius r, and the surface area of a sphere is $4\pi r^2$. Thus, the energy density on the surface of the sphere is given by:

$$I_T A/(4\pi r^2). \quad (6)$$

If the source emits into a hemisphere, (i.e., Θ=2π), the energy density goes up by a factor of two, 2x. Thus, equation (5) above scales adequately until the limit of Θ approaches zero.

Absorbing and Scattering Shield Embodiment

Figure 5:
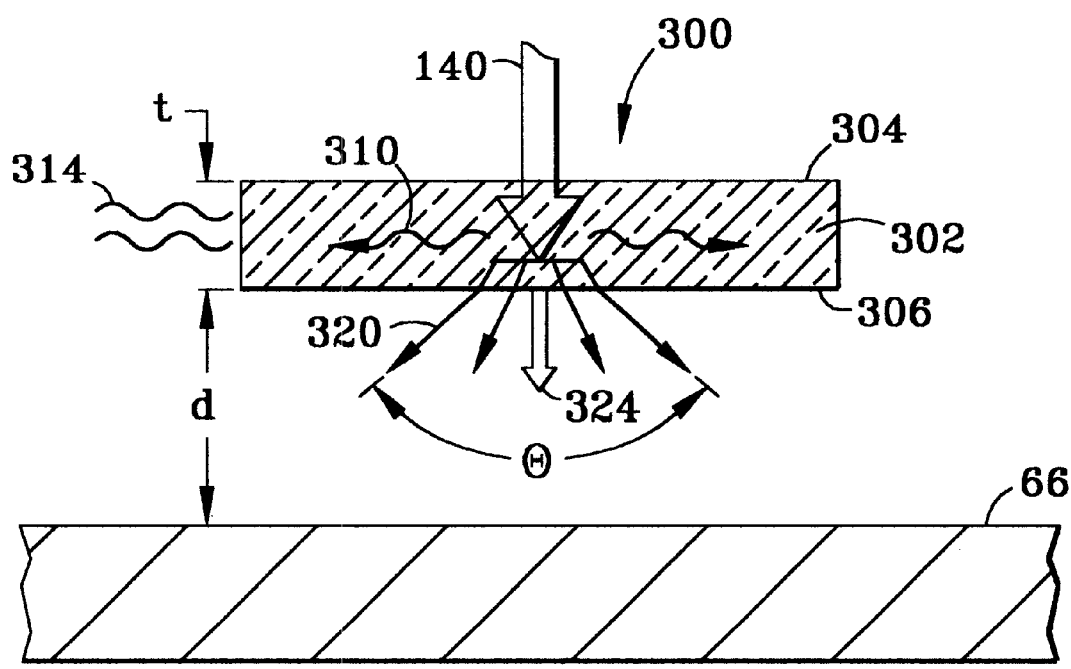
FIG. 5 is a cross-section schematic diagram of a section of a processing tool of FIG. 2, further including a third embodiment of the shield device according the present invention comprising a shield that is both scattering and absorbing.

With reference to FIG. 5, in a third embodiment of the present invention, the radiation shield device 100 of FIG. 2 comprises an absorbing and scattering shield 300 having a volume 302, an upper surface 304, and a lower surface 306. Shield 300 comprises a material designed to both absorb and scatter portions of a high-irradiance beam 140 (which may be a spillover beam such as spillover beam 82, or a direct beam such as high-irradiance radiation 80, depending on the position of shield 300; see FIG. 2) with volume 302. Thus, a first goal of shield 300 is to dissipate the absorbed energy in volume 302 (as indicated by arrows 310) and to radiate this energy out into space as heat (as indicate by wavy lines 314), as described above in connection with the first embodiment of the present invention. In addition, a second goal of shield 300 is to scatter radiation that is not absorbed in volume 302 over a scattering angle (i.e., scattering coefficient), Θ, to form scattered radiation 320, in a manner similar to that described above in connection with the second embodiment of the present invention.

To properly effectuate volume absorption and volume scattering so that shield 300 need not be replaced often (if at all), the absorption coefficient of the shield material needs to be such that the absorbed energy density is maintained below the shield's irradiance damage threshold, $I_{DS}$ (Joules/cm³).

As set forth above, the irradiance (energy density), $I_{ABS}$, absorbed in volume 302 of shield 300 is given by:

$$I_{ABS}(\text{joules/cm}^3) = I_R \, a \, (1-\exp(-at)) \; (\text{joules/cm}^3) \quad (7)$$

where a is the absorption coefficient of the shield, t is the thickness of the shield, and $I_R$ is the irradiance of radiation 140. Shield 300 needs to have a sufficient thickness, t, so that scattered radiation 320 and attenuated radiation 324 due to absorption exiting lower surface 306 of the shield is incapable of damaging tool portion 66, which has an irradiance damage threshold $I_{DT}$. In other words, the combined irradiance of scattered radiation 320 and attenuated radiation 324 needs to be below the tool portion irradiance damage threshold $I_{DT}$.

The combined irradiance of radiation 320 and 324 exiting lower surface 306 and incident tool portion 66 is given by:

$$I_T(\text{joules/cm}^2) = I_R \, (\exp(-at)) \, A/(d^2\Theta) \; (\text{joules/cm}^2) \quad (8)$$

where d, A and Θ are defined as above, here with respect to shield 300. Exemplary materials for shield 300 include pot opal and turbid absorbing media, an example of the latter being small particles such as latex or polystyrene spheres suspending in a liquid that absorbs at the wavelength of interest).

While the present invention has been described in connection with preferred embodiments, it will be understood that it is not so limited. On the contrary, it is intended to cover all alternatives, modifications and equivalents as may be included within the spirit and scope of the invention as defined in the appended claims. Further, although analytic expressions have been provided for the various embodiments, it will be understood by one skilled in the art that the present invention may be more conveniently practice by empirically determining the best arrangement (position) and appropriate of the shield thickness for each individual application.

What is claimed is:

1. A shield for protecting a tool portion having an irradiance damage threshold from high-irradiance radiation from a light source when irradiating a workpiece, said shield arranged between the light source and the tool portion and having an irradiance damage threshold, an absorption coefficient, a volume and a thickness, and designed to absorb in said volume, a portion of said high-irradiance radiation that would otherwise be incident the tool portion, wherein the shield maintains said absorbed high-irradiance radiation below said shield irradiance damage threshold, and wherein radiation exiting the shield and incident the tool portion has an irradiance below the irradiance damage threshold of the tool portion.

2. A shield according to claim 1, wherein said shield is arranged between the workpiece and the tool portion.

3. A shield according to claim 1, wherein said shield is made of a partially transmitting glass.

4. A shield having an irradiance damage threshold $I_{DT}$ for protecting a tool portion from damage due to high-irradiance radiation $I_R$ from a light source when irradiating a workpiece, said shield arranged between the light source and the tool portion and having a volume damage threshold $I_{DS}$, an absorption coefficient a, and a thickness t such that an irradiance $I_{ABS}$ absorbed by said shield from said high-irradiance radiation $I_R$ that would otherwise be incident the tool portion satisfies the condition:

$$I_{ABS} = I_R \, a \, (1-\exp(-at)) < I_{DS},$$

and wherein radiation exiting the shield and incident the tool portion has an irradiance $I_T$ which satisfies the condition:

$$I_T = I_R \, (\exp(-at)) < I_{DT}.$$

5. A shield according to claim 4, wherein said shield is arranged between the workpiece and the tool portion.

6. An apparatus that prevents a tool portion having an irradiance damage threshold from being irradiated by high-irradiance radiation from a light source while irradiating a workpiece, the apparatus comprising:
   a workpiece support member for supporting a workpiece; and
   the shield according to claim 1 arranged between the light source and the tool portion.

7. An apparatus that prevents a tool portion having an irradiance damage threshold $I_{DT}$ from being irradiated by high-irradiance radiation of irradiance $I_R$ from a light source while irradiating a workpiece, the apparatus comprising:

a workpiece support member for supporting a workpiece; and the shield according to claim 3 arranged between the light source and the tool portion.

8. A workpiece support member for supporting a workpiece having a workpiece outer edge, the workpiece support member being capable of protecting a tool portion having an irradiance damage threshold from high-irradiance radiation while irradiating the workpiece, the workpiece support member comprising:

a body with an outer surface and an upper surface with an outer edge, said upper surface capable of supporting the workpiece so that the workpiece outer edge extends beyond said workpiece support member outer edge; and the shield according to claim 1 arranged between the workpiece and the tool portion around said outer surface.

9. A workpiece support member according to claim 8, further including a lip on said workpiece support member body outer surface for supporting said shield.

10. A workpiece support member for supporting a workpiece having a workpiece outer edge and capable of protecting a tool portion having an irradiance damage threshold $I_{DT}$ from high-irradiance spillover radiation of irradiance $I_R$ while irradiating the workpiece, the workpiece support member comprising:

a body with an outer surface and an upper surface with an outer edge, said upper surface capable of supporting the workpiece so that the workpiece outer edge extends beyond said workpiece support member outer edge; and A shield according to claim 3 arranged between the workpiece and the tool portion around said outer surface.

11. A workpiece support member according to claim 10, further including a lip on said workpiece support member body outer surface for supporting said shield.

12. A shield for protecting a tool portion having an irradiance damage threshold from high-irradiance radiation from a light source when irradiating a workpiece, said shield arranged between the light source and the tool portion and having an irradiance damage threshold, a scattering coefficient, a volume and a thickness, and designed to scatter in said volume portion of said high-irradiance radiation that would otherwise be incident said tool portion, wherein said shield maintains said scattered high-irradiance radiation below said shield irradiance damage threshold, and wherein radiation exiting the shield and incident the tool portion has an irradiance below the irradiance damage threshold of the tool portion.

13. A shield according to claim 12, wherein said shield is arranged between the workpiece and the tool portion.

14. A shield for protecting a tool portion having an irradiance damage threshold $I_{DT}$ from damage due to high-irradiance radiation $I_R$ from a light source when irradiating a workpiece, said shield arranged between the light source and the tool portion and separated from the tool portion by a distance d, and having a scattering coefficient $\Theta$, a scattering area A and a thickness t, wherein radiation exiting the shield and incident the tool portion has an irradiance $I_T$ satisfying the condition:

$$I_T = I_R A/(\Theta d^2) < I_{DT}.$$

15. A shield according to claim 14, wherein said shield is arranged between the workpiece and the tool portion.

16. A shield according to claim 14, further having an absorption coefficient a and a shield irradiance damage threshold $I_{DS}$, and wherein said shield absorbs an irradiance $I_{ABS}$ given by:

$$I_{ABS} = I_R \, a(1-\exp(-at)) < I_{DS}.$$

17. A shield according to claim 12, wherein said shield comprises one of a turbid media and a opal glass.

18. An apparatus that prevents a tool portion having an irradiance damage threshold from being irradiated by high-irradiance radiation from a light source while irradiating a workpiece, the apparatus comprising:

a workpiece support member for supporting a workpiece; and the shield according to claim 12 arranged between the light source and the tool portion.

19. An apparatus for irradiating a workpiece with a high-irradiance irradiation $I_R$ and that prevents a tool portion having an irradiance damage threshold $I_{DT}$ from being irradiated by the high-irradiance radiation, the apparatus comprising:

a workpiece support member for supporting a workpiece; and the shield according to claim 14 arranged between the light source and the tool portion.

20. A workpiece support member for supporting a workpiece having an outer edge and capable of protecting a tool portion having an irradiance damage threshold from high-irradiance radiation otherwise incident the tool portion while irradiating the workpiece, the workpiece support member comprising:

a body with an outer surface and an upper surface with an outer edge, said upper surface capable of supporting the workpiece so that the workpiece outer edge extends beyond said workpiece support member outer edge; and the shield according to claim 12 arranged between the light source and the tool portion.

21. A workpiece support member according to claim 20, further including a lip on said outer surface for supporting said shield.

22. A workpiece support member for supporting a workpiece having an outer edge, capable of protecting a tool portion having an irradiance damage threshold $I_{DT}$ from high-irradiance radiation of irradiance $I_R$ otherwise incident the tool portion while irradiating the workpiece, the workpiece support member comprising:

a body with an outer surface and an upper surface with an outer edge, said upper surface capable of supporting the workpiece so that the workpiece outer edge extends beyond said workpiece support member outer edge: and the shield according to claim 14 arranged between the light source and the tool portion.

23. A workpiece support member according to claim 22, further including a lip on said outer surface for supporting said shield.

24. A shield for protecting a tool portion having an irradiance damage threshold from high-irradiance radiation from a light source wherein irradiating a workpiece, said shield arranged between the light source and the tool portion and having an irradiance damage threshold, an absorption coefficient, a volume, a scattering coefficient and a thickness, wherein said shield is designed to absorb and scatter in said volume a portion of the high-irradiance irradiation, wherein the shield maintains said absorbed high-irradiance radiation below said shield irradiance damage threshold, and wherein radiation exiting the shield and incident the tool portion has an irradiance below the irradiance damage threshold of the tool portion.

25. A shield according to claim 24, wherein said shield is arranged between the workpiece and the tool portion.

26. A shield according to claim 24, wherein said shield comprises opal glass.

27. A shield for protecting a tool portion having an irradiance damage threshold $I_{DT}$, from damage due to high-irradiance radiation of irradiance $I_R$ from a light source when irradiating a workpiece, said shield arranged between the workpiece and the tool portion and separated from the tool portion by a distance d, and having an irradiance damage threshold $I_{DS}$, an absorption coefficient a, a scattering coefficient $\Theta$, a scattering area A, and a thickness t such that an irradiance $I_{ABS}$ absorbed by said shield from the high-irradiance radiation satisfies the condition:

$$I_{ABS}=I_R \text{ a } (1-\exp(-at)),$$

and radiation transmitted through the shield and incident the tool portion has an irradiance $I_T$ satisfying the condition:

$$I_T=I_R (\exp(-at)) A/(d^2\Theta).$$

28. A shield according to claim 27 arranged between the workpiece and the tool portion.

29. An apparatus that prevents a tool portion having an irradiance damage threshold from being irradiated by high-irradiance radiation from a light source while irradiating a workpiece, the apparatus comprising:
 a workpiece support member for supporting a workpiece; and
 the shield according to claim 24 arranged between the light source and the tool portion.

30. An apparatus that prevents a tool portion having an irradiance damage threshold $I_{DT}$ from being irradiated by high-irradiance radiation from a light source while irradiating a workpiece, the apparatus comprising:
 a workpiece support member for supporting a workpiece; and
 the shield according to claim 26 arranged between the light source and the tool portion.

31. An apparatus supporting a workpiece having an outer edge, capable of protecting a tool portion from high-irradiance radiation otherwise incident the tool portion while irradiating the workpiece, comprising:
 a body with an outer surface and an upper surface with an outer edge, said upper surface capable of supporting the workpiece so that the workpiece outer edge extends beyond said workpiece support member outer edge: and
 the shield according to claim 24 arranged around said workpiece support member body outer surface and extending beyond the outer edge of said workpiece so as to intercept radiation passing said workpiece outer edge.

32. An apparatus according to claim 31, further including a lip on said workpiece support member body outer surface for supporting said shield.

33. An apparatus supporting a workpiece having an outer edge, capable of protecting a tool portion from high-irradiance radiation otherwise incident the tool portion while irradiating the workpiece, comprising:
 a body with an outer surface and an upper surface with an outer edge, said upper surface capable of supporting the workpiece so that the workpiece outer edge extends beyond said workpiece support member outer edge: and
 the shield according to claim 26 arranged around said workpiece support member body outer surface and extending beyond the outer edge of said workpiece so as to intercept radiation passing said workpiece outer edge.

34. An apparatus according to claim 33, further including a lip on said outer surface.

35. A method of attenuating high-irradiance radiation from a light source incident a tool portion of a tool while processing the workpiece, the tool portion having an irradiance damage threshold, the method comprising the steps of:
 a) arranging a shield between the light source and the tool portion, said shield having a volume and capable of absorbing a portion of the high-irradiance radiation within said volume; and
 b) absorbing a portion of the high-irradiance radiation that would be incident the tool portion within said volume of said shield so that radiation leaving said shield and incident said tool portion has an irradiance below the irradiance damage threshold of the tool portion.

36. A method according to claim 35, wherein said arranging step a) further includes positioning said shield between the workpiece and the tool portion.

37. A method of attenuating high-irradiance radiation from a light source incident a tool portion of a tool while processing the workpiece, the tool portion having an irradiance damage threshold, the method comprising the steps of:
 a) arranging a shield between the light source and the tool portion, said shield having a volume and capable of scattering a portion of the high-irradiance radiation within said volume; and
 b) scattering a portion of the high-irradiance radiation that would be incident the tool portion within said volume of said shield so that radiation leaving said shield and incident said tool portion has an irradiance below the irradiance damage threshold of the tool portion.

38. A method according to claim 37, wherein arranging step a. further includes positioning said shield between the workpiece and the tool portion.

39. A method of attenuating high-irradiance radiation from a light source incident a tool portion of a tool while processing the workpiece, the tool portion having an irradiance damage threshold, the method comprising the steps of:
 a) arranging a shield between the light source and the tool portion, said shield having a volume and capable of absorbing and scattering a portion of the high-irradiance radiation within said volume; and
 b) absorbing and scattering a portion of the high-irradiance radiation that would be incident the tool portion within said volume of said shield so that radiation leaving said shield and incident said tool portion has an irradiance below the irradiance damage threshold of the tool portion.

40. A method according to claim 39, wherein arranging step a. further includes positioning said shield between the workpiece and the tool portion.

41. A method of processing a workpiece with high-irradiance radiation from a light source using a tool having a tool portion with an irradiance damage threshold, comprising the steps of:

a) supporting the workpiece on a workpiece support member;

b) arranging a shield according to claim 1 between the light source and workpiece so as to intercept any of the high-irradiance radiation that would otherwise be incident the tool portion; and c) irradiating the workpiece with the high-irradiance radiation.

42. A method of processing a workpiece with high-irradiance radiation from a light source using a workpiece processing tool having a tool portion with an irradiance damage threshold, comprising the steps of:

a) supporting the workpiece on a workpiece support member;

b) arranging a shield according to claim 12 between the light source and workpiece so as to intercept any of the high-irradiance radiation that would otherwise be incident the tool portion; and c) irradiating the workpiece with high-irradiance radiation.

43. A method of processing a workpiece with high-irradiance radiation from a light source using a workpiece processing tool having a tool portion with an irradiance damage threshold, comprising the steps of:

a) supporting the workpiece on a workpiece support member;

b) arranging a shield according to claim 24 between the light source and workpiece so as to intercept any of the high-irradiance radiation that would otherwise be incident the tool portion; and c) irradiating the workpiece with high-irradiance radiation.

\* \* \* \* \*